United States Patent
Lin (10) Patent No.: US 9,460,487 B2
(45) Date of Patent: Oct. 4, 2016

(54) DISPLAY DEVICE AND IMAGE DISPLAY METHOD

(71) Applicant: Wistron Corporation, New Taipei (TW)

(72) Inventor: Yu-Ping Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 123 days.

(21) Appl. No.: 14/538,774

(22) Filed: Nov. 11, 2014

(65) Prior Publication Data

US 2015/0302552 A1  Oct. 22, 2015

(30) Foreign Application Priority Data

Apr. 22, 2014  (TW) .............................. 103114581 A (51) Int. Cl.
*G06T 3/40* (2006.01)
*G09G 5/391* (2006.01)

(52) U.S. Cl.
CPC ................ *G06T 3/40* (2013.01); *G09G 5/391* (2013.01); *G09G 2340/0407* (2013.01); *G09G 2340/0435* (2013.01); *G09G 2340/0442* (2013.01)

(58) Field of Classification Search
CPC ...................................................... G06T 3/40
See application file for complete search history.

(56) References Cited

U.S. PATENT DOCUMENTS

| 6,392,642 | B1 | 5/2002 | Wu | |
|---|---|---|---|---|
| 7,672,009 | B2* | 3/2010 | Ciccarelli | H04N 1/00127 358/1.18 |
| 2005/0081174 | A1* | 4/2005 | Chang | G06F 17/5045 716/102 |
| 2006/0056716 | A1 | 3/2006 | Komeno | |
| 2010/0149378 | A1* | 6/2010 | Suzuki | H04N 5/232 348/231.99 |
| 2012/0001914 | A1* | 1/2012 | Pan | G06Q 30/0241 345/428 |
| 2012/0188448 | A1* | 7/2012 | Kimura | H04N 7/0117 348/521 |

FOREIGN PATENT DOCUMENTS

TW              417080         1/2001

OTHER PUBLICATIONS

Office action mailed on Dec. 25, 2015 for the Taiwan application No. 103114581, filing date: Apr. 22, 2014, p. 1 line 10-14, p. 2 and p. 3 line 1-2.

* cited by examiner

*Primary Examiner* — Joni Richer
*Assistant Examiner* — Grace Q Li
(74) *Attorney, Agent, or Firm* — Winston Hsu; Scott Margo (57) ABSTRACT

A display device includes a display unit having N adjustable screen resolutions; a storage unit storing a setting list, the setting list recording the N adjustable screen resolutions and N display ratio parameters; a processing unit retrieving a current screen resolution from the display unit and comparing the current screen resolution with the N adjustable screen resolutions, the processing unit selecting an i-th display ratio parameter corresponding to an i-th adjustable screen resolution from the N display ratio parameters when the current screen resolution is identical to the i-th adjustable screen resolution; and an image generating unit generating an image according to the i-th display ratio parameter and displaying the image in the display unit.

12 Claims, 6 Drawing Sheets

DISPLAY DEVICE AND IMAGE DISPLAY METHOD

BACKGROUND OF THE INVENTION

1. Field of the Invention

The invention relates to a display device and an image display method and, more particularly, to a display device and an image display method capable of displaying an image with a fixed size in different screen resolutions.

2. Description of the Prior Art

So far various display devices (e.g. computer screen, television, monitor, etc.) have anon screen display (OSD) function. In general, the OSD may render images corresponding to various parameters (e.g. brightness, contrast, color, volume, etc.) for a user to adjust on the screen. Furthermore, a display device may have a lot of screen resolutions (e.g. 800*600, 1024*768, 1600*900, etc.) for the user to adjust. To prevent an OSD image from enlarging, reducing and/or shifting due to different screen resolutions, some prior arts install a scaler in the display device, so as to display the OSD image with a fixed size at a fixed position in the display device. However, the scaler added to the display device will increase the manufacturing cost of the display device.

SUMMARY OF THE INVENTION

The invention provides a display device and an image display method capable of displaying an image with a fixed size in different screen resolutions, so as to solve the aforesaid problems.

According to the claimed invention, a display device comprises a display unit, a storage unit, a processing unit and an image generating unit. The display unit has N adjustable screen resolutions, wherein N is a positive integer larger than 1. The storage unit stores a setting list, the setting list records the N adjustable screen resolutions and N display ratio parameters, and each of the N adjustable screen resolutions is corresponding to one of the N display ratio parameters. The processing unit is electrically connected to the display unit and the storage unit. The processing unit retrieves a current screen resolution from the display unit and compares the current screen resolution with the N adjustable screen resolutions. The processing unit selects an i-th display ratio parameter corresponding to an i-th adjustable screen resolution of the N adjustable screen resolutions from the N display ratio parameters when the current screen resolution is identical to the i-th adjustable screen resolution, wherein i is a positive integer smaller than or equal to N. The image generating unit is electrically connected to the display unit and the processing unit. The image generating unit generates an image according to the i-th display ratio parameter and displays the image in the display unit.

According to the claimed invention, the image has a fixed horizontal length and a fixed vertical length when the image is displayed in the display unit, each of the N display ratio parameters comprises a horizontal pixel amount per unit length and a vertical pixel amount per unit length, and the image generating unit multiplies the fixed horizontal length by the horizontal pixel amount per unit length of the i-th display ratio parameter and multiplies the fixed vertical length by the vertical pixel amount per unit length of the i-th display ratio parameter, so as to generate the image.

According to the claimed invention, a horizontal distance is between a reference point of the image and a first edge of the display unit and a vertical distance is between the reference point of the image and a second edge of the display unit when the image is displayed in the display unit, the first edge is perpendicular to the second edge, and the image generating unit multiplies the horizontal distance by the horizontal pixel amount per unit length of the i-th display ratio parameter and multiplies the vertical distance by the vertical pixel amount per unit length of the i-th display ratio parameter, so as to display the image at a fixed position in the display unit according to the reference point.

According to the claimed invention, the display device further comprises a button disposed at a periphery of the display unit, wherein the fixed position is corresponding to the button.

According to the claimed invention, the display unit displays a setting interface for setting the fixed horizontal length and the fixed vertical length.

According to the claimed invention, an image display method comprises steps of providing a setting list, wherein the setting list records N adjustable screen resolutions of a display unit and N display ratio parameters, each of the N adjustable screen resolutions is corresponding to one of the N display ratio parameters, and N is a positive integer larger than 1; retrieving a current screen resolution from the display unit; comparing the current screen resolution with the N adjustable screen resolutions; selecting an i-th display ratio parameter corresponding to an i-th adjustable screen resolution of the N adjustable screen resolutions from the N display ratio parameters when the current screen resolution is identical to the i-th adjustable screen resolution, wherein i is a positive integer smaller than or equal to N; generating an image according to the i-th display ratio parameter; and displaying the image in the display unit.

According to the claimed invention, the image has a fixed horizontal length and a fixed vertical length when the image is displayed in the display unit, each of the N display ratio parameters comprises a horizontal pixel amount per unit length and a vertical pixel amount per unit length, and the image display method further comprises step of multiplying the fixed horizontal length by the horizontal pixel amount per unit length of the i-th display ratio parameter and multiplying the fixed vertical length by the vertical pixel amount per unit length of the i-th display ratio parameter, so as to generate the image.

According to the claimed invention, a horizontal distance is between a reference point of the image and a first edge of the display unit and a vertical distance is between the reference point of the image and a second edge of the display unit when the image is displayed in the display unit, the first edge is perpendicular to the second edge, and the image display method further comprises step of multiplying the horizontal distance by the horizontal pixel amount per unit length of the i-th display ratio parameter and multiplying the vertical distance by the vertical pixel amount per unit length of the i-th display ratio parameter, so as to display the image at a fixed position in the display unit according to the reference point.

According to the claimed invention, a button is disposed at a periphery of the display unit and the fixed position is corresponding to the button.

According to the claimed invention, the image display method further comprises steps of displaying a setting interface in the display unit; and setting the fixed horizontal length and the fixed vertical length in the setting interface.

As mentioned in the above, the invention makes the setting list in advance according to a plurality of adjustable screen resolutions of the display unit and then stores the setting list in the storage unit of the display device. When a user is going to show an OSD image or other images in the display unit, the invention will calculate the horizontal pixel amount and the vertical pixel amount, which are covered by the fixed horizontal length and the fixed vertical length of the image, according to the current screen resolution of the display unit and the setting list. Accordingly, the invention can display the image with a fixed size in the display unit in different screen resolutions, so as to prevent the image from enlarging or reducing due to different screen resolutions. Furthermore, the invention may set the reference point on the image and then calculates the horizontal pixel amount and the vertical pixel amount, which are covered by the horizontal distance and the vertical distance between the reference point of the image and the edges of the display unit, according to the current screen resolution of the display unit and the setting list. Accordingly, the invention can display the image with a fixed size at a fixed position in the display unit in different screen resolutions. The aforesaid fixed position may be corresponding to the button disposed at the periphery of the display unit, so as to prevent the image from shifting due to different screen resolutions. Moreover, the invention may display the setting interface, which is used for setting the fixed horizontal length and the fixed vertical length of the image, in the display unit. Accordingly, the user can modify the fixed horizontal length and the fixed vertical length of the image displayed in the display unit through the setting interface according to his/her preference. Since the invention displays the image with the fixed size in different screen resolutions through software without the scaler or other hardware of the prior art, the invention can further reduce the manufacturing cost.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
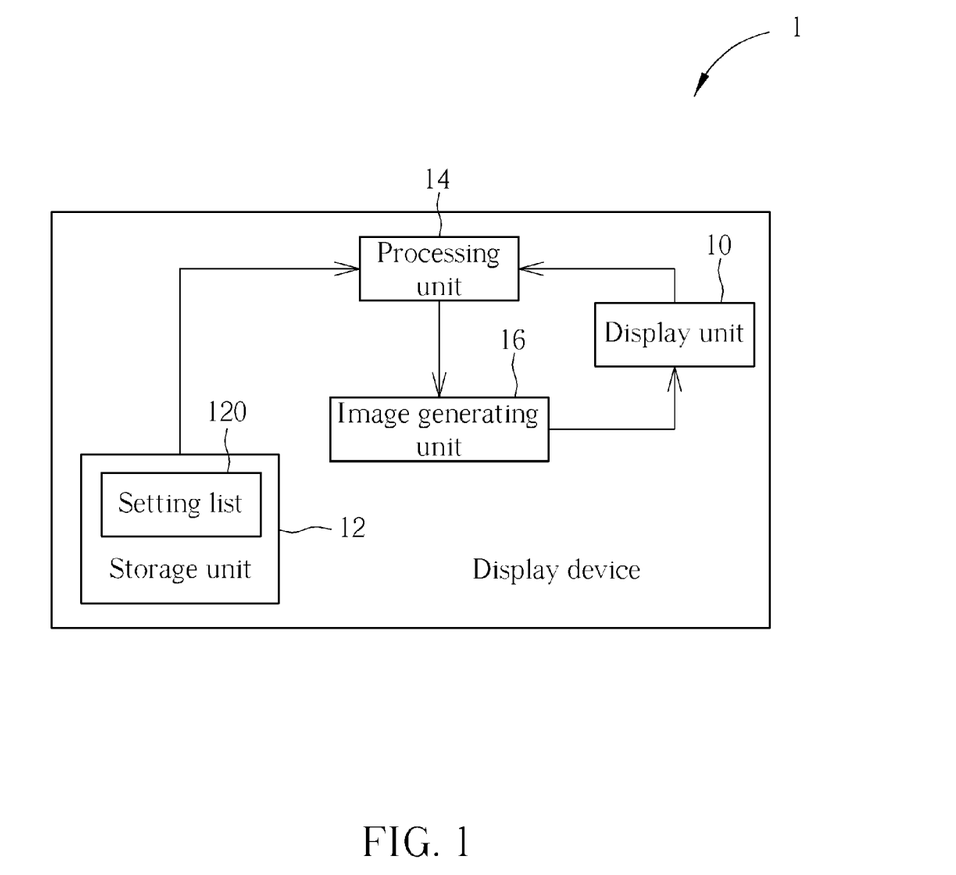
FIG. 1 is a functional block diagram illustrating a display device according to an embodiment of the invention.
Figure 2:
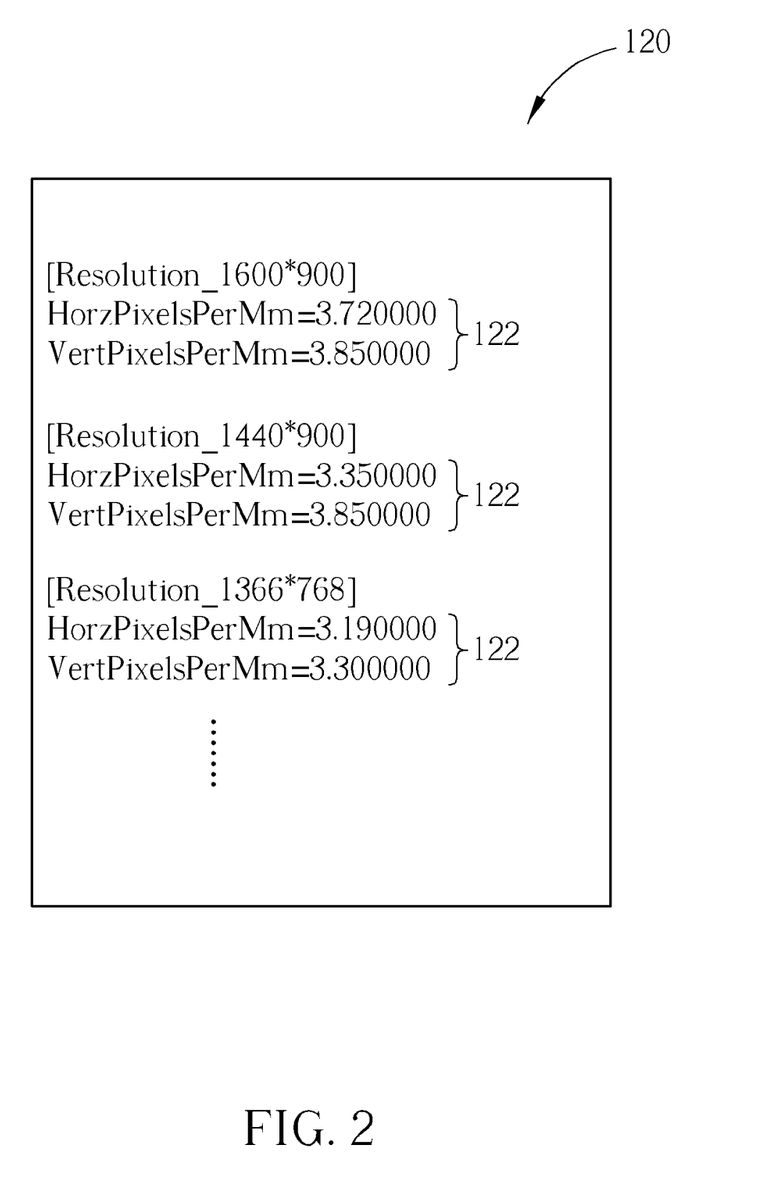
FIG. 2 is a schematic diagram illustrating the setting list shown in FIG. 1.
Figure 3:
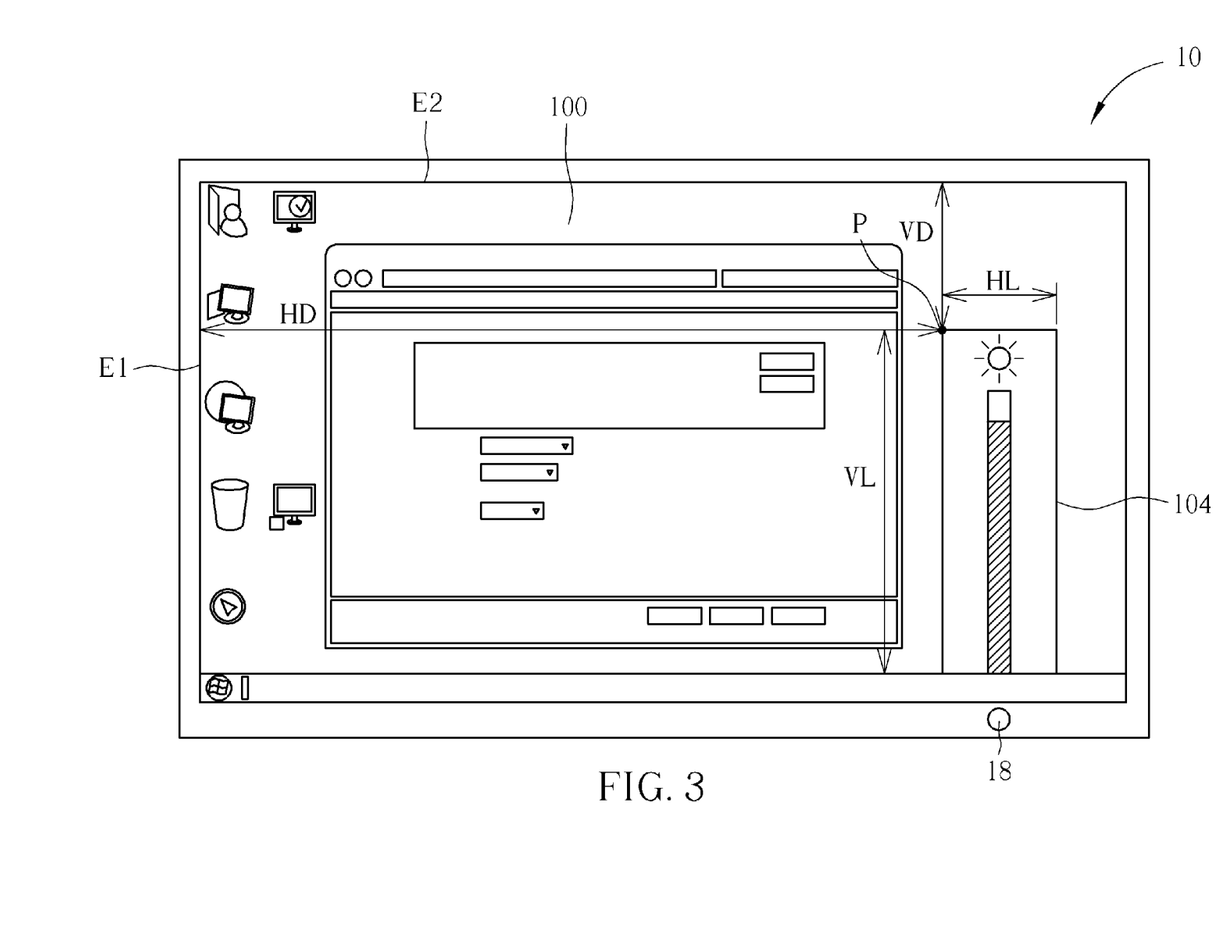
FIG. 3 is a schematic diagram illustrating a screen displayed in the display unit shown in FIG. 1 in a screen resolution.
Figure 4:
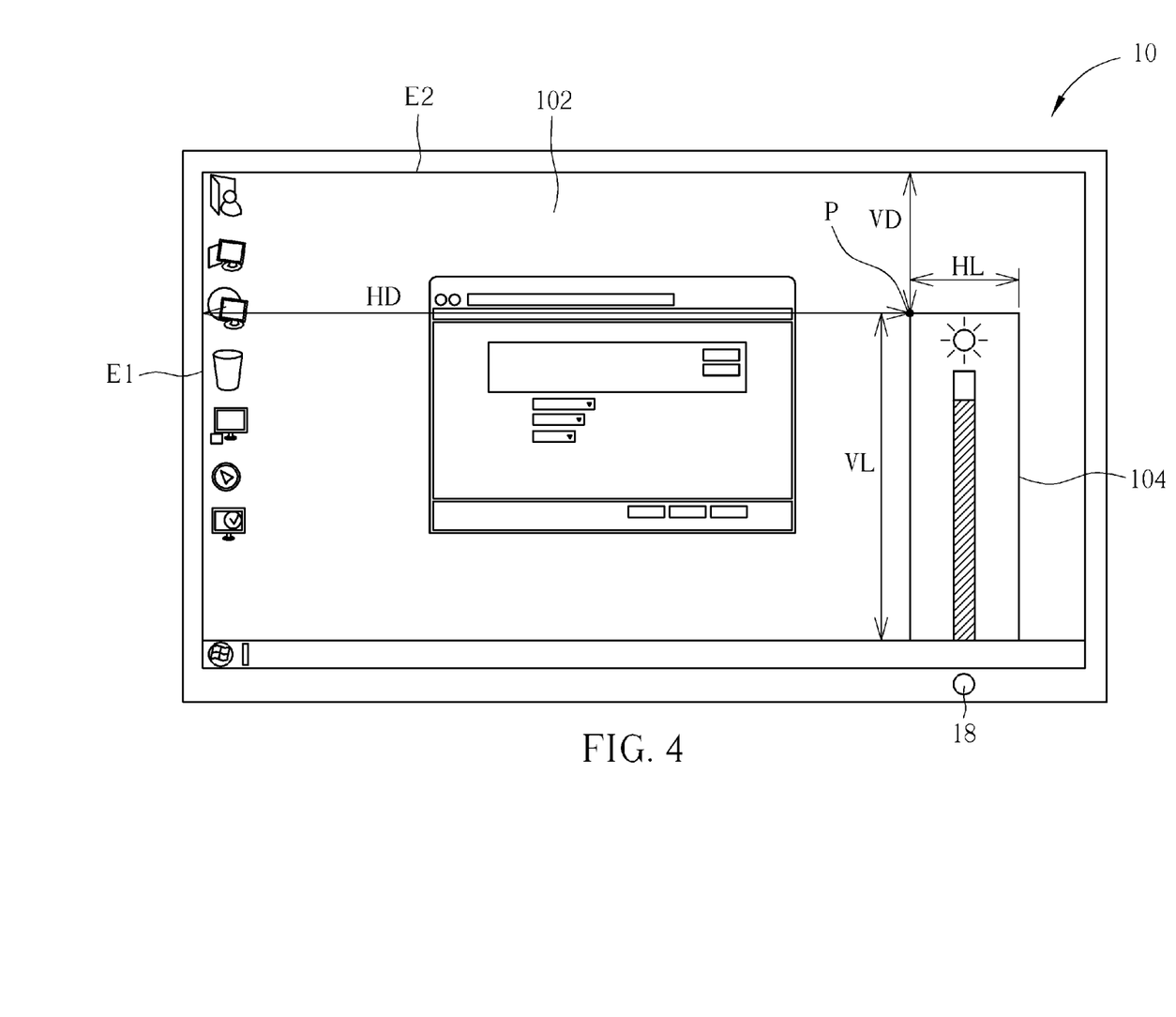
FIG. 4 is a schematic diagram illustrating a screen displayed in the display unit shown in FIG. 1 in another screen resolution.
Figure 5:
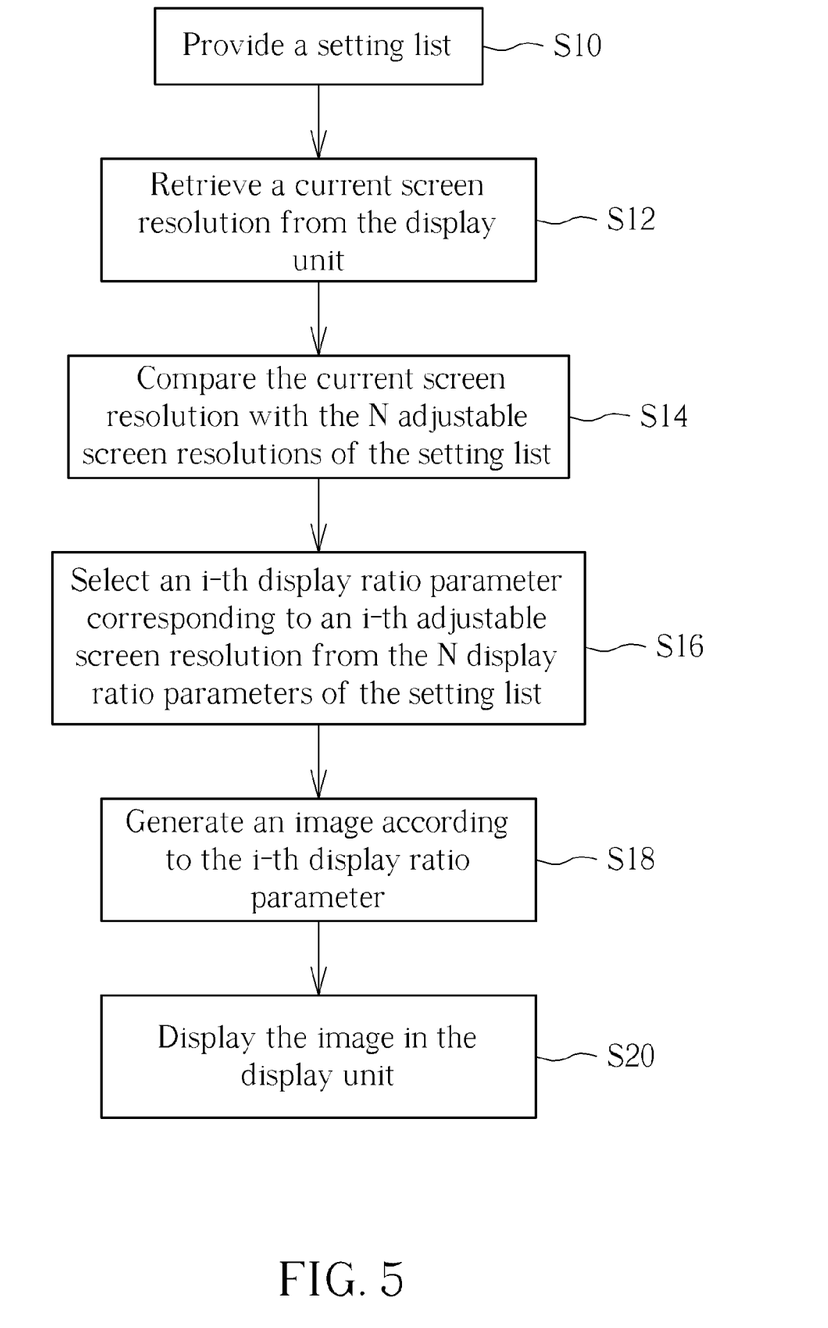
FIG. 5 is a flowchart illustrating an image display method according to an embodiment of the invention.

Referring to FIGS. 1 to 5, FIG. 1 is a functional block diagram illustrating a display device 1 according to an embodiment of the invention, FIG. 2 is a schematic diagram illustrating the setting list 120 shown in FIG. 1, FIG. 3 is a schematic diagram illustrating a screen 100 displayed in the display unit 10 shown in FIG. 1 in a screen resolution, FIG. 4 is a schematic diagram illustrating a screen 102 displayed in the display unit 10 shown in FIG. 1 in another screen resolution, and FIG. 5 is a flowchart illustrating an image display method according to an embodiment of the invention. The image display method shown in FIG. 5 is adapted to the display device 1 shown in FIG. 1.

As shown in FIG. 1, the display device 1 comprises a display unit 10, a storage unit 12, a processing unit 14 and an image generating unit 16, wherein the processing unit 14 is electrically connected to the display unit 10 and the storage unit 12, and the image generating unit 16 is electrically connected to the display unit 10 and the processing unit 14. In this embodiment, the display device 1 may be an electronic device with display function, such as a computer screen, a television, a monitor, etc.; the display unit 10 may be a liquid crystal display device, a plasma display device or other display devices; the storage unit 12 may be a hard disc, a memory, a memory card or other data storage devices; the processing unit 14 may be a processor or controller with data processing function; and the image generating unit 16 may be an on screen display (OSD) generator or other image generators. In general, the display device 1 may be further equipped with some necessary hardware or software components for specific purposes, such as a power supply, a circuit board, applications, an antenna, an input/output module, a communication module, etc., and it depends on practical applications.

In this embodiment, the display unit 10 may have N adjustable screen resolutions, wherein N is a positive integer larger than 1. For example, if the display unit 10 has three adjustable screen resolutions including 1600*900, 1440*900 and 1366*768, N is equal to 3 accordingly. It should be noted that the number and scale of the adjustable screen resolutions of the display unit 10 are not limited to the aforesaid embodiment and depend on practical applications.

In this embodiment, the storage unit 12 stores a setting list 120 and the setting list 120 records the N adjustable screen resolutions and N display ratio parameters, wherein each of the N adjustable screen resolutions is corresponding to one of the N display ratio parameters. Preferably, each of the N display ratio parameters comprises a horizontal pixel amount per unit length and a vertical pixel amount per unit length, wherein the horizontal pixel amount per unit length represents that a ratio of pixel amount to real display length along a horizontal direction of the display unit 10, and the vertical pixel amount per unit length represents that a ratio of pixel amount to real display length along a vertical direction of the display unit 10. As shown in FIG. 2, the setting list 120 records three display ratio parameters 122 corresponding to the three adjustable screen resolutions 1600*900, 1440*900 and 1366*768, wherein the horizontal pixel amount per unit length is represented by HorzPixelsPerMm and the vertical pixel amount per unit length is represented by VertPixelsPerMm.

For example, the invention may calculate the horizontal pixel amount per unit length HorzPixelsPerMm and the vertical pixel amount per unit length VertPixelsPerMm corresponding to each of the adjustable screen resolutions according to the following steps. First of all, the invention displays a rectangle with known pixel amount in the display unit 10, such as a rectangle with 500*500 pixels. Afterward, the invention uses a straightedge to measure a real display size of the rectangle. For example, the measurement result may be 135.4 mm*131.5 mm. Finally, the invention will obtain that HorzPixelsPerMm=500/135.4=3.69276 and VertPixelsPerMm=500/131.5=3.80228.

For another example, the invention may also calculate the horizontal pixel amount per unit length HorzPixelsPerMm and the vertical pixel amount per unit length VertPixelsPerMm corresponding to each of the adjustable screen resolutions according to the following steps. First of all, the invention may draw a rectangle with a size of 100 mm*100 mm on a transparent sheet and then attach the transparent sheet onto a center of the display unit 10. Afterward, the invention may execute a program allowing a user to operate a mouse to select four corners of the rectangle and then the program will calculate the pixel amount corresponding to the rectangle. For example, the calculation result may be 300*320 pixels. Finally, the invention will obtain that HorzPixelsPerMm=300/100=3 and VertPixelsPerMm=320/100=3.2.

It should be noted that the manner for calculating the horizontal pixel amount per unit length HorzPixelsPerMm and the vertical pixel amount per unit length VertPixelsPerMm can be determined according to practical applications, so the invention is not limited to the aforesaid embodiments.

As shown in FIGS. 3 and 4, the display unit 10 displays screens 100 and 102 in different screen resolutions, wherein the screen resolution of the screen 100 is lower than the screen resolution of the screen 102. When a user is going to show an image 104 in the display unit 10, the invention will display the image 104 with a fixed size in the display unit 10 according to a current screen resolution of the display unit 10 and the setting list 120, so as to prevent the image 104 from enlarging or reducing due to different screen resolutions. In this embodiment, when the image 104 is displayed in the display unit 10, the image 104 has a fixed horizontal length HL and a fixed vertical length VL no matter what the scale of the current screen resolution is.

Accordingly, the invention has to provide a setting list 120 (step S10 in FIG. 5) in advance, such that the image 104 can be displayed in the display unit 10 in different screen resolutions by a fixed size. Afterward, when a user is going to show the image 104 in the display unit 10, the processing unit 14 will retrieve a current screen resolution from the display unit 10 (step S12 in FIG. 5) and compares the current screen resolution with the N adjustable screen resolutions of the setting list 120 (step S14 in FIG. 5). Then, the processing unit 14 selects an i-th display ratio parameter 122 corresponding to an i-th adjustable screen resolution of the N adjustable screen resolutions from the N display ratio parameters of the setting list 120 when the current screen resolution is identical to the i-th adjustable screen resolution (step S16 in FIG. 5), wherein i is a positive integer smaller than or equal to N. Finally, the image generating unit 16 generates an image 104 according to the i-th display ratio parameter 122 (step S18 in FIG. 5) and displays the image 104 in the display unit 10 (step S20 in FIG. 5). In step S18 of FIG. 5, the image generating unit 16 may multiply the fixed horizontal length HL of the image 104 by the horizontal pixel amount per unit length HorzPixelsPerMm of the i-th display ratio parameter 122 and multiply the fixed vertical length VL of the image 104 by the vertical pixel amount per unit length VertPixelsPerMm of the i-th display ratio parameter 122, so as to generate the image 104.

For example, if the current screen resolution of the screen 100 shown in FIG. 3 is 1366*768, the image generating unit 16 may multiply the fixed horizontal length HL of the image 104 by the horizontal pixel amount per unit length HorzPixelsPerMm of the third display ratio parameter 122 of the setting list 120 (i.e. HL*3.190000) and multiply the fixed vertical length VL of the image 104 by the vertical pixel amount per unit length VertPixelsPerMm of the third display ratio parameter 122 of the setting list 120 (i.e. VL*3.300000), so as to generate the image 104. Accordingly, the invention can obtain the horizontal pixel amount (i.e. HL*HorzPixelsPerMm) and the vertical pixel amount (i.e. VL*VertPixelsPerMm), which are covered by the fixed horizontal length HL and the fixed vertical length VL of the image 104 in the current screen resolution 1366*768.

For example, if the current screen resolution of the screen 102 shown in FIG. 4 is 1600*900, the image generating unit 16 may multiply the fixed horizontal length HL of the image 104 by the horizontal pixel amount per unit length HorzPixelsPerMm of the first display ratio parameter 122 of the setting list 120 (i.e. HL*3.720000) and multiply the fixed vertical length VL of the image 104 by the vertical pixel amount per unit length VertPixelsPerMm of the first display ratio parameter 122 of the setting list 120 (i.e. VL*3.850000), so as to generate the image 104. Accordingly, the invention can obtain the horizontal pixel amount (i.e. HL*HorzPixelsPerMm) and the vertical pixel amount (i.e. VL*VertPixelsPerMm), which are covered by the fixed horizontal length HL and the fixed vertical length VL of the image 104 in the current screen resolution 1600*900.

Accordingly, the invention can display the image 104 with a fixed size in the display unit 10 in different screen resolutions, so as to prevent the image 104 from enlarging or reducing due to different screen resolutions.

Furthermore, as shown in FIGS. 3 and 4, when the image 104 is displayed in the display unit 10, a horizontal distance HD is between a reference point P of the image 104 and a first edge E1 of the display unit 10 and a vertical distance VD is between the reference point P of the image 104 and a second edge E2 of the display unit 10, wherein the first edge E1 is perpendicular to the second edge E2. In step S18 of FIG. 5, the image generating unit 16 may multiply the horizontal distance HD by the horizontal pixel amount per unit length HorzPixelsPerMm of the i-th display ratio parameter 122 and multiply the vertical distance VD by the vertical pixel amount per unit length VertPixelsPerMm of the i-th display ratio parameter 122, so as to display the image 104 at a fixed position in the display unit 10 according to the reference point P.

For example, if the current screen resolution of the screen 100 shown in FIG. 3 is 1366*768, the image generating unit 16 may multiply the horizontal distance HD by the horizontal pixel amount per unit length HorzPixelsPerMm of the third display ratio parameter 122 of the setting list 120 (i.e. HD*3.190000) and multiply the vertical distance VD by the vertical pixel amount per unit length VertPixelsPerMm of the third display ratio parameter 122 of the setting list 120 (i.e. VD*3.300000), so as to generate the image 104. Accordingly, the invention can obtain the horizontal pixel amount (i.e. HD*HorzPixelsPerMm) and the vertical pixel amount (i.e. VD*VertPixelsPerMm), which are covered by the horizontal distance HD and the vertical distance VD in the current screen resolution 1366*768.

For example, if the current screen resolution of the screen 102 shown in FIG. 4 is 1600*900, the image generating unit 16 may multiply the horizontal distance HD by the horizontal pixel amount per unit length HorzPixelsPerMm of the first display ratio parameter 122 of the setting list 120 (i.e. HD*3.720000) and multiply the vertical distance VD by the vertical pixel amount per unit length VertPixelsPerMm of the first display ratio parameter 122 of the setting list 120 (i.e. VD*3.850000), so as to generate the image 104. Accordingly, the invention can obtain the horizontal pixel amount (i.e. HD*HorzPixelsPerMm) and the vertical pixel amount (i.e. VD*VertPixelsPerMm), which are covered by the horizontal distance HD and the vertical distance VD in the current screen resolution 1600*900.

Accordingly, the invention can display the image 104 with a fixed size at a fixed position in the display unit 10 in different screen resolutions, so as to prevent the image 104 from shifting due to different screen resolutions.

Still further, the display device 1 may further comprise a button 18 disposed at a periphery of the display unit 10. The user can press the button 18 to show the image 104. As shown in FIGS. 3 and 4, the fixed position of the image 104 is corresponding to the button 18. In other words, the invention can display the image 104 at the fixed position corresponding to the button no matter what the scale of the current screen resolution is, so as to prevent the image 104 from shifting due to different screen resolutions.

Figure 6:
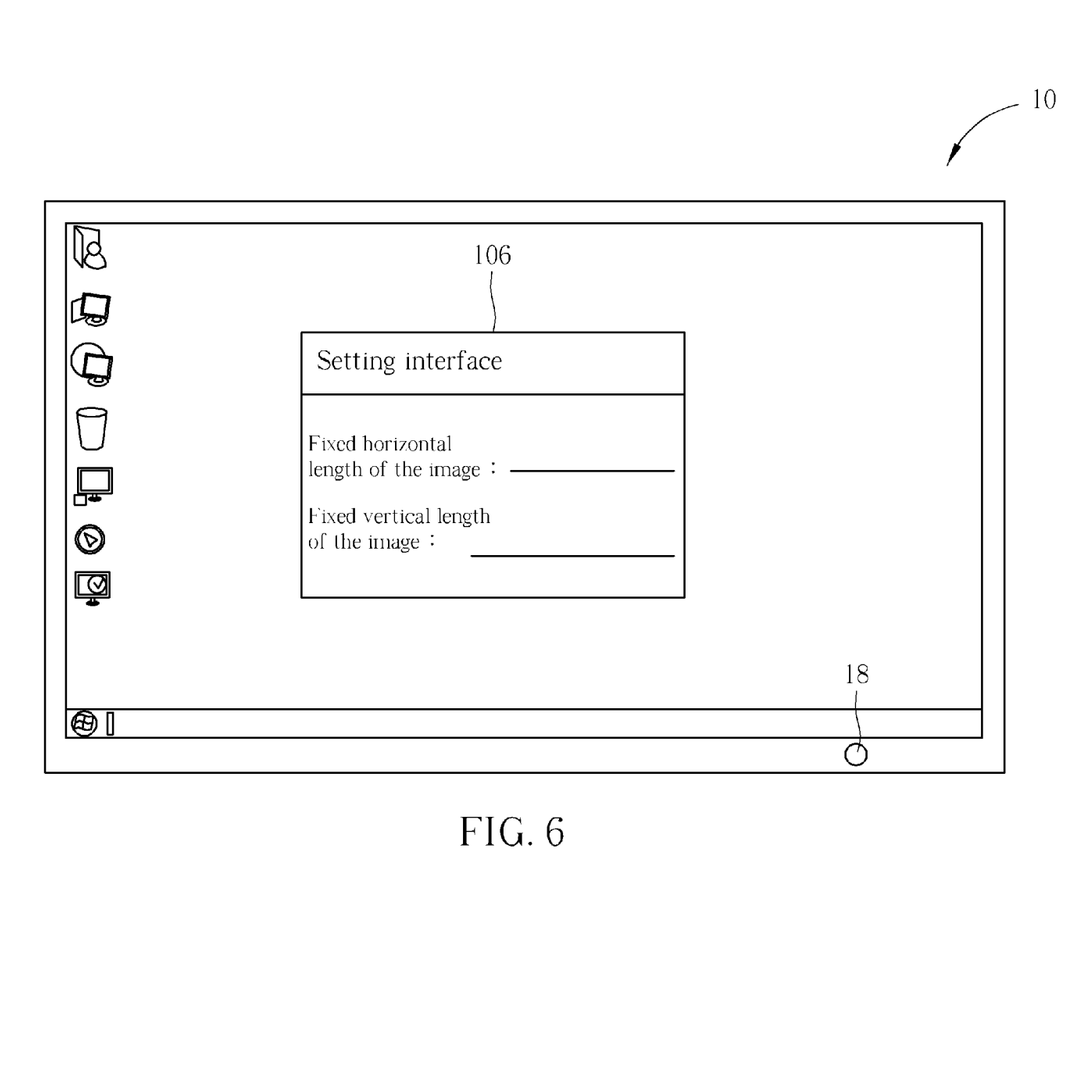
FIG. 6 is a schematic diagram illustrating a setting interface displayed in the display unit shown in FIG. 1.

Referring to FIG. 6, FIG. 6 is a schematic diagram illustrating a setting interface 106 displayed in the display unit 10 shown in FIG. 1. As shown in FIG. 6, the invention may display a setting interface 106 in the display unit 10, wherein the setting interface 106 is used for setting the fixed horizontal length HL and the fixed vertical length VL of the image 104. Accordingly, the user can set the fixed horizontal length HL and the fixed vertical length VL of the image 104 in the setting interface 106 according to his/her preference.

As mentioned in the above, the invention makes the setting list in advance according to a plurality of adjustable screen resolutions of the display unit and then stores the setting list in the storage unit of the display device. When a user is going to show an OSD image or other images in the display unit, the invention will calculate the horizontal pixel amount and the vertical pixel amount, which are covered by the fixed horizontal length and the fixed vertical length of the image, according to the current screen resolution of the display unit and the setting list. Accordingly, the invention can display the image with a fixed size in the display unit in different screen resolutions, so as to prevent the image from enlarging or reducing due to different screen resolutions. Furthermore, the invention may set the reference point on the image and then calculates the horizontal pixel amount and the vertical pixel amount, which are covered by the horizontal distance and the vertical distance between the reference point of the image and the edges of the display unit, according to the current screen resolution of the display unit and the setting list. Accordingly, the invention can display the image with a fixed size at a fixed position in the display unit in different screen resolutions. The aforesaid fixed position may be corresponding to the button disposed at the periphery of the display unit, so as to prevent the image from shifting due to different screen resolutions. Moreover, the invention may display the setting interface, which is used for setting the fixed horizontal length and the fixed vertical length of the image, in the display unit. Accordingly, the user can modify the fixed horizontal length and the fixed vertical length of the image displayed in the display unit through the setting interface according to his/her preference. Since the invention displays the image with the fixed size in different screen resolutions through software without the scaler or other hardware of the prior art, the invention can further reduce the manufacturing cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device comprising:
   a display unit having N adjustable screen resolutions, N being a positive integer larger than 1;
   a storage unit storing a setting list, the setting list recording the N adjustable screen resolutions and N display ratio parameters, each of the N adjustable screen resolutions being corresponding to one of the N display ratio parameters, each of the N display ratio parameters comprising a horizontal pixel amount per unit length and a vertical pixel amount per unit length;
   a processing unit electrically connected to the display unit and the storage unit, the processing unit retrieving a current screen resolution from the display unit and comparing the current screen resolution with the N adjustable screen resolutions, the processing unit selecting an i-th display ratio parameter corresponding to an i-th adjustable screen resolution of the N adjustable screen resolutions from the N display ratio parameters when the current screen resolution is identical to the i-th adjustable screen resolution, i being a positive integer smaller than or equal to N; and
   an image generating unit electrically connected to the display unit and the processing unit, the image generating unit generating an image according to the i-th display ratio parameter and displaying the image in the display unit;
   wherein a horizontal distance is between a reference point of the image and a first edge of the display unit and a vertical distance is between the reference point of the image and a second edge of the display unit when the image is displayed in the display unit, the first edge is perpendicular to the second edge, and the image generating unit multiplies the horizontal distance by the horizontal pixel amount per unit length of the i-th display ratio parameter and multiplies the vertical distance by the vertical pixel amount per unit length of the i-th display ratio parameter, so as to display the image at a fixed position in the display unit according to the reference point.

2. The display device of claim 1, wherein the image has a fixed horizontal length and a fixed vertical length when the image is displayed in the display unit, and the image generating unit multiplies the fixed horizontal length by the horizontal pixel amount per unit length of the i-th display ratio parameter and multiplies the fixed vertical length by the vertical pixel amount per unit length of the i-th display ratio parameter, so as to generate the image.

3. The display device of claim 2, wherein the display unit displays a setting interface for setting the fixed horizontal length and the fixed vertical length.

4. The display device of claim 1, further comprising a button disposed at a periphery of the display unit, wherein the fixed position is corresponding to the button.

5. An image display method comprising:
   providing a setting list, wherein the setting list records N adjustable screen resolutions of a display unit and N display ratio parameters, each of the N adjustable screen resolutions is corresponding to one of the N display ratio parameters, each of the N display ratio parameters comprises a horizontal pixel amount per unit length and a vertical pixel amount per unit length, and N is a positive integer larger than 1;
   retrieving a current screen resolution from the display unit;
   comparing the current screen resolution with the N adjustable screen resolutions;
   selecting an i-th display ratio parameter corresponding to an i-th adjustable screen resolution of the N adjustable screen resolutions from the N display ratio parameters when the current screen resolution is identical to the i-th adjustable screen resolution, wherein i is a positive integer smaller than or equal to N;

generating an image according to the i-th display ratio parameter; and displaying the image in the display unit;

wherein a horizontal distance is between a reference point of the image and a first edge of the display unit and a vertical distance is between the reference point of the image and a second edge of the display unit when the image is displayed in the display unit, the first edge is perpendicular to the second edge, and the image display method further comprises:

multiplying the horizontal distance by the horizontal pixel amount per unit length of the i-th display ratio parameter and multiplying the vertical distance by the vertical pixel amount per unit length of the i-th display ratio parameter, so as to display the image at a fixed position in the display unit according to the reference point.

6. The image display method of claim 5, wherein the image has a fixed horizontal length and a fixed vertical length when the image is displayed in the display unit, and the image display method further comprises:

multiplying the fixed horizontal length by the horizontal pixel amount per unit length of the i-th display ratio parameter and multiplying the fixed vertical length by the vertical pixel amount per unit length of the i-th display ratio parameter, so as to generate the image.

7. The image display method of claim 6, further comprising:

displaying a setting interface in the display unit; and setting the fixed horizontal length and the fixed vertical length in the setting interface.

8. The image display method of claim 5, wherein a button is disposed at a periphery of the display unit and the fixed position is corresponding to the button.

9. A display device comprising:

a display unit having a plurality of adjustable screen resolutions;

a storage unit storing a setting list, the setting list recording the adjustable screen resolutions and a plurality of display ratio parameters, each of the adjustable screen resolutions being corresponding to one of the display ratio parameters, each of the display ratio parameters comprising a horizontal pixel amount per unit length and a vertical pixel amount per unit length;

a processing unit electrically connected to the display unit and the storage unit, the processing unit retrieving a current screen resolution from the display unit and comparing the current screen resolution with the adjustable screen resolutions, the processing unit selecting one of the display ratio parameters corresponding to one of the adjustable screen resolutions when the current screen resolution is identical to the one of the adjustable screen resolutions; and an image generating unit electrically connected to the display unit and the processing unit, the image generating unit generating an image according to the one of the display ratio parameter and displaying the image in the display unit;

wherein a horizontal distance is between a reference point of the image and a first edge of the display unit and a vertical distance is between the reference point of the image and a second edge of the display unit when the image is displayed in the display unit, the first edge is perpendicular to the second edge, and the image generating unit multiplies the horizontal distance by the horizontal pixel amount per unit length of the one of the display ratio parameters and multiplies the vertical distance by the vertical pixel amount per unit length of the one of the display ratio parameters, so as to display the image at a fixed position in the display unit according to the reference point.

10. The display device of claim 9, wherein the image has a fixed horizontal length and a fixed vertical length when the image is displayed in the display unit, and the image generating unit multiplies the fixed horizontal length by the horizontal pixel amount per unit length of the one of the display ratio parameters and multiplies the fixed vertical length by the vertical pixel amount per unit length of the one of the display ratio parameters, so as to generate the image.

11. The display device of claim 10, wherein the display unit displays a setting interface for setting the fixed horizontal length and the fixed vertical length.

12. The display device of claim 9, further comprising a button disposed at a periphery of the display unit, wherein the fixed position is corresponding to the button.

* * * * *